United States Patent [19]
Griggs

[11] 3,808,371
[45] Apr. 30, 1974

[54] REAL-TIME MECHANICAL DETECTION OF DIPHTHONGS FOR SPEECH CONTROLLED PHONETIC TYPEWRITER

[76] Inventor: David Thurston Griggs, 5128 S. Rolling Rd., Baltimore, Md. 21227

[22] Filed: Aug. 13, 1971

[21] Appl. No.: 177,764

Related U.S. Application Data

[63] Continuation-in-part of Ser. No. 86,868, Nov. 2, 1970, abandoned, which is a continuation-in-part of Ser. No. 1,739, Jan. 9, 1970, Pat. No. 3,646,576.

[52] U.S. Cl. ............................................. 179/1 SA
[51] Int. Cl. ............................................. G10l 1/04
[58] Field of Search .......... 179/1 SA, 1 SB; 35/35 C Primary Examiner—Kathleen H. Claffy
Assistant Examiner—Jon Bradford Leaheey
Attorney, Agent, or Firm—Misegades, Douglas & Levy

[57] ABSTRACT

An alternate and improved method and apparatus detecting and recognizing diphthongs by real-time mechanical means from spoken input. The improvement distinguishes diphthongs from other sounds including simple, single vowel sounds. The identification is rendered by means of transduced electrical signals each of which represents a distinctive diphthong relevant to subsequent written transcription by machine. The method herein is based upon measurement of the dynamical and signal frequency changing quantities found in the oral input during the frequency glides which characterize dipthongs; it does not identify the diphthongs only as paired phonemes.

4 Claims, 3 Drawing Figures

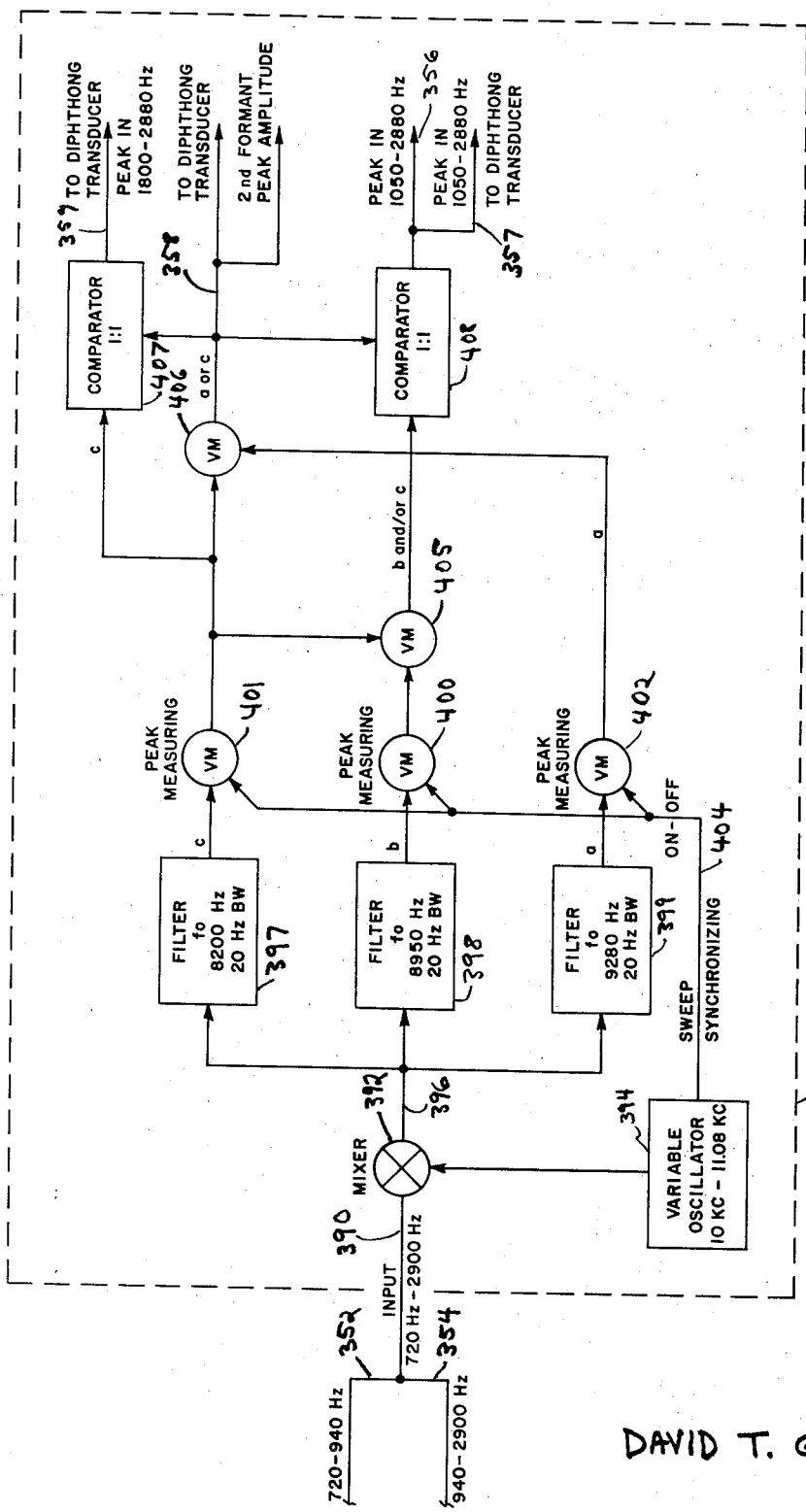
Fig. 2 SECOND FORMANT SCANNER

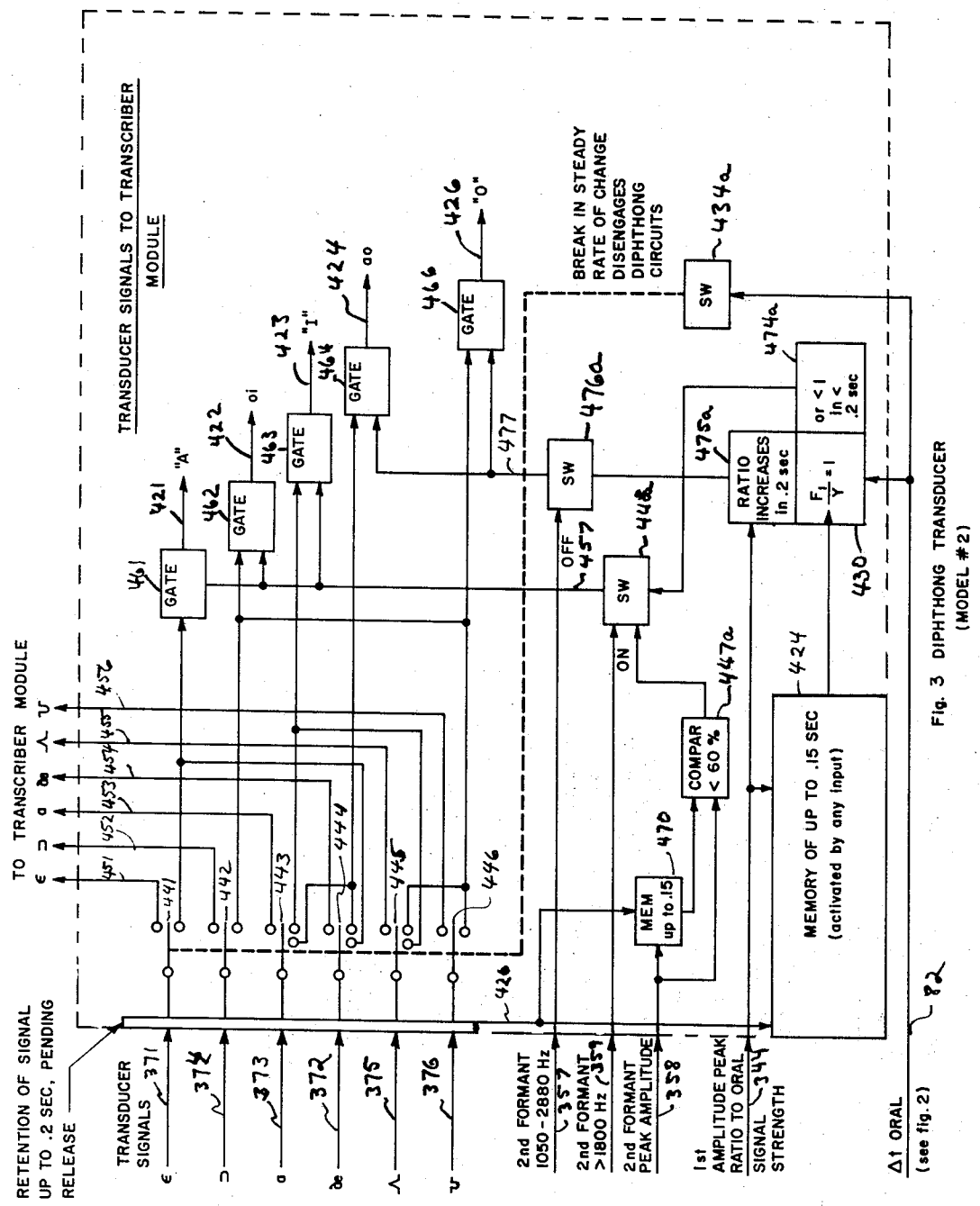
Fig. 3 DIPHTHONG TRANSDUCER (MODEL #2)

REAL-TIME MECHANICAL DETECTION OF DIPHTHONGS FOR SPEECH CONTROLLED PHONETIC TYPEWRITER

CROSS-REFERENCES TO RELATED APPLICATIONS

The present invention is a continuation-in-part of the inventor's application Ser. No. 86,868, filed Nov. 2, 1970, for "Sound Separator for Talk-Writer Apparatus," now abandoned, which in turn is a continuation-in-part of the inventor's application Ser. No. 1,739, filed Jan. 9, 1970, for "Speech Controlled Phonetic Typewriter," now U.S. Pat. No 3,646,576. Therefore, the respective specifications of U.S. Pat. No. 3,646,576 and Ser. No. 86,868 are incorporated herein by reference in accordance with 35 U.S.C. §112 and 120; Rule 78; and the Notice in the *Official Gazette* of Jan. 27, 1970. FIGS. 7A and 8 of U.S. Pat. No. 3,646,576 supra, are each modified as shown by new FIGS 2 and 3, respectively, in the present application. The numbering of the new FIGS. 2 and 3 is adopted under Rule 83 as a matter of convenience and clarity. Other changes may occur, but the salient and essential features of the improvement are those considered essential, while other changes may occur within the standard of ordinary skill of one to which the subject matter as a whole would have been obvious at the time the invention was made.

FIELD OF THE INVENTION

The present invention relates to apparatus and methods for detection and analysis of oral signals and deriving therefrom vowel signals identified as diphthongs. More particularly, the invention relates to detection or scanning means for determining frequency changes of the peak amplitude of second formant signals together with changes in its relative strength and in the relative strength of the first formant. Also a specific feature of the invention combines with these detected or scanned changes measured or comparison analysis of (1) signals indicating the starting value sound, and (2) signals indicating the rate-of-change-of-signal strength thereof.

BACKGROUND OF THE INVENTION

The background of the embodiment of the present invention is set out in the aforementioned copending patent and application and it is found that improved and unobvious results may be obtained in the new second formant scanner (FIG. 2) and in the new diphthong transducer (FIG. 3) as they corelate to the output connections of the vowel detection unit FIG. 7 of U.S. Pat. No. 3,646,576, the diphthong transducer FIG. 8 of U.S. Pat. No. 3,646,576, and the transcriber module FIG. 9 of U.S. Pat. No. 3,646,576.

BRIEF SUMMARY OF THE INVENTION

An object and advantage of the invention is to provide apparatus and methods based upon measurement of the dynamical and signal frequency changing quantities found in the oral input signal during the frequency glides which characterize diphthongs, and without identifying the diphthongs as paired single phonemes.

Another object of the invention is to provide discrimination between the five diphthongs which in the English language structure always tend to function as single vowels, i.e., "A," "ao," "I," "oi" and "O." Thus, by determining frequency changes of the peak amplitude of the second formant together with changes in its relative strength and the relative strength of the first formant, and by combining with this the signal measurements indicating the starting vowel sound and signals indicating the rate of change of signal strength, the present invention is seen to simply provide discrimination between the five diphthongs.

The object and feature of the invention therefore is to produce by mechanical and instantaneous means, separate identification signals corresponding to the oral inputs for each diphthong. It is noted that "U" may not or does not always function as a single vowel in the orthography of the English language, so it should be and can be identified as /IU/.

The present invention should be noted as providing altered output connections from the vowel detection unit (FIG. 7 of U.S. Pat. No. 3,646,576), and these are shown in Table 1 for simplicity in description in lieu of providing a completely new set of all the drawings.

BRIEF DESCRIPTION OF THE NEW DRAWINGS

The above and other objects and advantages of the invention will become apparent upon full consideration of the following detailed description and accompanying drawings in which:

FIG. 2 shows a block and circuit diagram of an improved second formant scanner unit according to a best mode and preferred embodiment of the invention, for processing the second formant of vowel sounds; and FIG. 3 shows a block and circuit diagram of an improved diphthong transducer for detecting and processing sounds.

DETAILED DESCRIPTION

Figure 1:
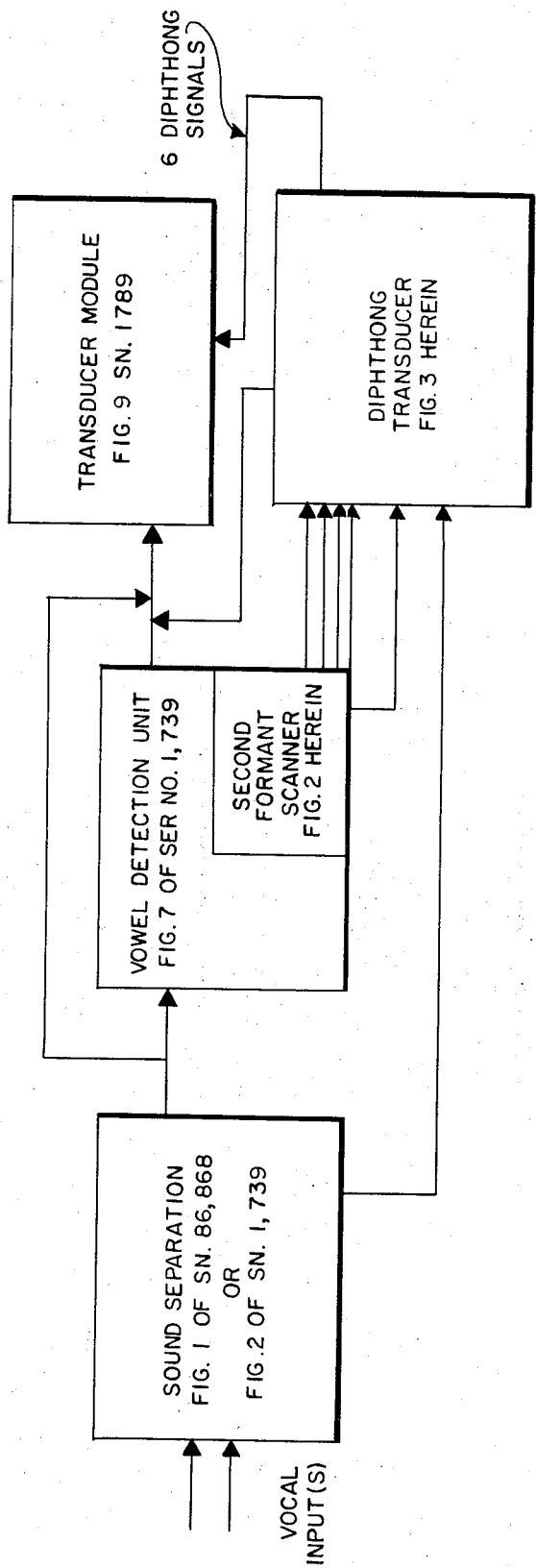
FIG. 1 is a block diagram of the system according to the preferred embodiment of the invention.

Referring now to the drawings, there is shown a second formant scanner (FIG. 2) having a mixer 392 in scanner 328 in which heterodyning of the incoming signal with a sweep oscillator 394 is performed so that peak measuring voltmeters 400–402 can be used to read the peak value. Input voltages in the range from 720 to 2900 Hz passing over conductor 390 to the mixer 392. The resulting signal on conductor 396 is passed through filter 397 centered on 8200 Hz with a 20 Hz bandwidth as well as filters 398,399.

The filtered signal outputs (a,b,c) from filters 397,398, 399 are separately applied to peak measuring voltmeters 400,401, 402, as shown, and are activated separately in synchronism with the sweep oscillator 394 output applied over conductor 404.

The bandwidths thus being isolated are 720 to 1,050 Hz; 1,050 to 1,800 Hz; and 1,800 to 2,880 Hz, and respecting their relative ranges are considered as low, middle and high bandwidths, respectively.

The higher of the two peak amplitudes is detected in peak-voltmeters 400,401,402 indicating the peak amplitude of the second formant when signal outputs from voltmeters 401 and 402 are supplied to voltmeter 406 which, in turn, furnishes information on conductor 358 to comparator 407, and then signal outputs from voltmeters 400 and 401 are applied to voltmeter 405, which in turn supplies information on to a comparator 408. The information on conductor 358 is also fed to each of the comparators 407,408 as well as constituting a signal output for the diphthong transducer (FIG. 3) and the second formant peak amplitude in FIG. 7 of U.S. Pat. No. 3,646,576, as shown in FIG. 2.

The output of comparators 407,408 exists when the coupled inputs are essentially in a 1:1 relation. A conductor 359 provides output from the comparator 407 to the diphthong transducer in FIG. 3 showing or indicating peaks in 1,800 to 2,880 Hz. Similarly, conductors 356 and 357 provide outputs from the comparator 408 to the diphthong transducer (FIG. 3) and to the vowel transducer 348 in FIG. 7 of U.S. Pat. No. 3,646,576 indicating peaks in the range 1,050 to 2,880 Hz.

The second formant scanner 328 in FIG. 2 thus produces bandwidth indications in conductors 357 and 359, and produces an indication of the amplitude of the peak of the second formant in conductor 358.

The diphthong transducer 420 in FIG. 3 receives inputs of the rate of change of the total oral signal on conductor 82 from FIG. 2 or FIG. 1 of Ser. No. 86,868. From the vowel unit (FIG. 7 of U.S. Pat. No. 3,646,576) it receives the first formant ratio to total strength signal on conductor 344. Next FIG. 3 shows it receives from the second formant scanner (FIG. 2) on conductors 358 and 359, and also from conductor 357, an indication when the second formant peak exists or lies between 1,050 and 2,800 Hz. Thus conductor 359 provides indication when the second formant peak exists or lies between 1,800 and 2,900 Hz.

Other inputs are the six vowel signals on conductors 371 to 376 (see Table 1) as provided from the vowel detection unit (FIG. 7 of U.S. Pat. No. 3,646,576), and each is passed on through the diphthong transducer (FIG. 3) as outputs on conductors 451 to 456 as shown to the transcriber module 20 (FIG. 9 of U.S. Pat. No. 3,646,576), only if they are not found to be starts of identifiable diphthongs.

Other outputs from the diphthong transducer 420 (FIG. 3) are signals indicating the presence of certain sounds as processed in gates 461 to 466 and passed over conductors 421 to 426 as shown, and as described herein by incorporation by reference U.S. Pat. No. 3,646,576.

The total oral rate of signal on conductor 82 is supplied to a switch 434a which operates gauged switches 441,442,443,444, 445,446, so that when there is an unsteady rate of change, the simple incoming phoneme signals in effect bypass the diphthong transducer 420.

Three of the switches 443,444,445 have double-pole contacts to create two separate circuits for each of them within the diphthong transducer for enabling multiple inputs of initial sounds for several of the diphthongs. Each incoming vowel phoneme signal is retained for up to 0.2 seconds upon entering the diphthong transducer until released by a break in the steady rate of change or by release of a diphthong signal. During that time, the circuits supply each such vowel signal to its appropriate gate or gates 461 to 466, as shown in FIG. 3.

Gates 464 and 466 will not operate to release diphthongs signals for "ao" or "O" without an additional input derived from first-formant information. The ratio of the first-formant peak to total oral signal on conductor 344 is stored in a memory 424 that is triggered by any vowel input on conductor 344 for up to 1.5 seconds; if in 0.2 second the ratio shall have increased as measured on conductor 475a, a signal is passed to switch 476a. It does not pass that switch if the second formant peak is over 1,050 Hz; otherwise, the switch passes the signal via conductor 477 to gates 464 and 466 for matching with the input phoneme for the appropriate diphthong.

First-formant information is used similarly by the memory 424 for opening gates 461,462 or 463. A different ratiometer 474a is used in which the first-formant peak ratio decreases rather than increases. When this decrease occurs, a signal is passed to switch 448a. Switch 448a is activated by a similar circuit for the second-formant peak; the second-formant peak value 358 from FIG. 2 is retained by a memory unit 470 and then compared in comparator 447a to the subsequent second-formant peak within 0.15 second later to determine if it shall have dropped to about 60 percent; if the requisite drop occurs, a signal is passed to switch 448a. A third condition is necessary before a signal from 474a will be passed by this switch, however; there must be a signal indicating that the second-formant peak is 1,800 Hz or more. That information comes through connector 359. The output from switch 448a then is passed via connector 457 to open gates 461,462 or 463.

Activity in the second formant bandwidth above 1,050 Hz is shown through connector 357 to switch 476a. This provides selectivity of opening between switches 476a and 448a giving primacy in selection to switch 448a.

The improvement invention embodied in the present disclosure presents apparatus and methods of discrimination between diphthongs by determining frequency changes of the peak amplitude of the second formant compared together with changes in its relative strength of the first-formant, and by combining with this signal, measurement signals indicating the starting vowel sound and signals indicating the rate of change of signal strength.

Additional embodiments of the invention in this specification will occur to others and therefore it is intended that the true spirit of the invention be limited only by the appended claims and not by the embodiment described hereinabove. Accordingly, reference should be made to the following claims in determining the true spirit of the invention.

TABLE 1

| Original outputs from vowel detector (FIG. 7) | | Changed outputs from vowel detector | |
| --- | --- | --- | --- |
| i | 371 | ε | |
| I | 372 | əe | |
| ε | 373 | ɑ | To Diphthong |
| əe | 374 | ɔ | Transducer |
| ɑ | 375 | Λ | |
| ɔ | 376 | Ω | |
| ʊ | 377 | i | |
| u | 378 | u | Direct to |
| Λ | 379 | I | Transcriber Module |
| r | 380 | r | |

What is claimed is:

1. Real-time mechanical detection of diphthongs for talk-writer apparatus comprising:
   a microphone for accepting oral signals;
   a detection and analysis transducer module component receiving said oral signals, said component having a vowel detection unit (FIG. 7, Ser. No. 1,739) responsive to oral signals to provide detection and differentiation of single vowels from each other by ratio comparison of first and second formant peaks-to-total strength and deriving vowel signals therefrom; and scanning means for deriving (FIG. 2) second formant peak amplitude signals based upon analysis of the dynamical and signal frequency changing quantities found in said oral input during frequency glides thereof;

said component having a diphthong transducer (FIG. 3) that combines the second formant peak amplitude signals of said scanning means with output of comparison means that provide measurement or comparison analysis of (1) signals indicating the starting value sound, and (2) signals indicating the rate-of-change-of-signal strength thereof.

2. The invention of claim 1 wherein said scanning means includes a first peak voltmeter means for low, middle and high range of signals, an ON-OFF sweep synchronizing signal means applying signals to said first peak voltmeter means, a second peak voltmeter means responsive to the output signal of the low and middle range of said first peak voltmeter means, a third peak voltmeter means responsive to the output signal of the low and high range of said first peak voltmeter means, first comparator means responsive to the low range of the first peak voltmeter means and the third peak voltmeter means, and a second comparator means responsive to the output of the second and third peak voltmeter means.

3. The invention according to claim 1 wherein said scanning means deriving second formant peak amplitude signals is based upon measurement analysis.

4. The invention according to claim 1 wherein said scanning means deriving second formant peak amplitude signals is based upon comparison analysis.

* * * * *